No. 789,001. PATENTED MAY 2, 1905.
W. J. BUSSINGER.
COFFEE MILL.
APPLICATION FILED JULY 13, 1904.
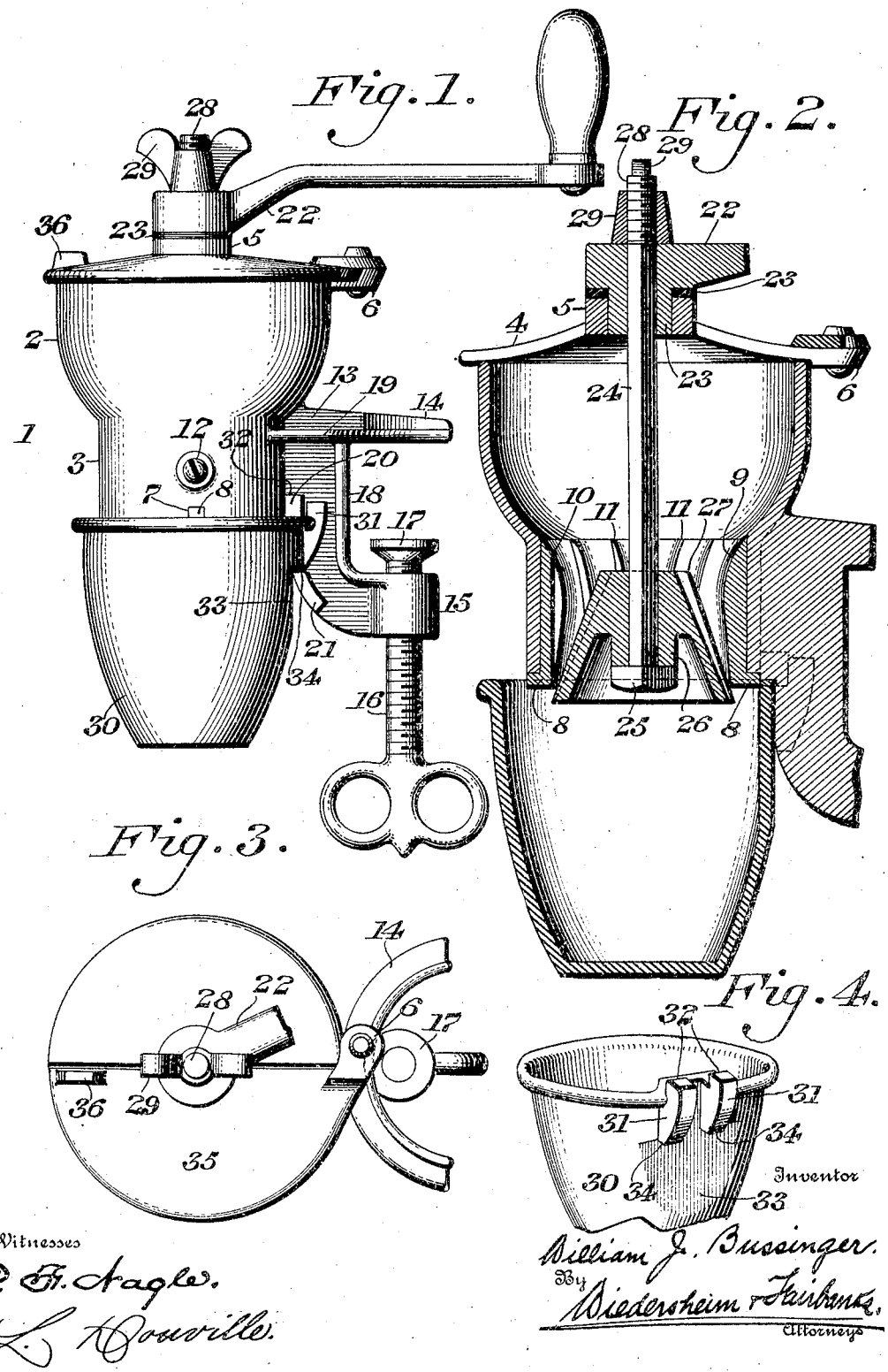

No. 789,001.

Patented May 2, 1905.

UNITED STATES PATENT OFFICE.

WILLIAM J. BUSSINGER, OF PHILADELPHIA, PENNSYLVANIA, ASSIGNOR TO THOMAS DEVLIN, LOUIS J. McGRATH, WILLIAM O. THOMPSON, WILLIAM J. BUSSINGER, AND JOHN FINNEGAN, TRADING AS NATIONAL SPECIALTY MANUFACTURING COMPANY.

COFFEE-MILL.

SPECIFICATION forming part of Letters Patent No. 789,001, dated May 2, 1905.

Application filed July 13, 1904. Serial No. 216,373.

*To all whom it may concern:*

Be it known that I, WILLIAM J. BUSSINGER, a citizen of the United States, residing in the city and county of Philadelphia, State of Pennsylvania, have invented a new and useful Improvement in Coffee-Mills, of which the following is a specification.

My invention consists of an improvement in coffee-mills having novel means for mounting the grinders and for adjusting the same.

It further consists of novel features of constructions, all as will be hereinafter fully set forth.

Figure 1 represents a side elevation of a coffee-mill embodying my invention. Fig. 2 represents a vertical sectional view with the handle broken away. Fig. 3 represents a plan view showing the handle broken away. Fig. 4 represents a perspective view of the upper portion of the receiving-cup.

Similar numerals of reference indicate corresponding parts in the figures.

Referring to the drawings, 1 designates a coffee-mill consisting of the hopper 2, from which depends the sleeve 3, said hopper having integral therewith the plate 4, which extends substantially over one-half of the upper portion of said hopper and has the integral bearing 5, the same being situated directly over and at substantially the center of the opening formed by the sleeve 3, the said plate 4 having a projecting lug 6 integral therewith and extending beyond the wall of the hopper 2. In the lower portion of the sleeve 3 are provided the recesses 7, in which are adapted to be seated the lugs 8, which extend from the stationary grinder 9, the upper walls of which are adapted to substantially embrace and fit the walls of the sleeve 3, the inner upper walls 10 of the cutter 9 being reduced inwardly, forming a flaring mouth or opening, and said cutter being provided with the cutting edges 11. The cutter is held in position by any suitable means—for example, by the set-screw 12—it being evident that the lugs 8, engaging in the recesses 7, prevent improper rotation of the said cutter 9. Secured to or forming part of the sleeve 3 are means for engaging said mill with a suitable support, said means consisting of the rib 13, having the projecting arm 14 and the boss 15 below said arm, said boss having a threaded opening therethrough adapted to engage with a screw 16, which has the head 17 thereon, the said rib 13 being provided with the stiffening-beads 18 and 19. 20 designates lugs which project from each side of said rib 13 and from said sleeve 3, and beneath said lug 20 are the lugs 21, which project from either side of said rib 13, having a space between said flanges 20 and 21.

22 designates a handle which is provided with the boss 23, the outer wall of which is curved and is adapted to be seated in bearing 5 and to rotate therein, said handle having a washer 23 interposed between the upper edge of said bearing and said handle. The boss is provided with a square opening adapted to engage with a spindle 24, which has a head 25 thereon, said head being adapted to engage with a movable cutter 26 and in conjunction with the spindle 24 supports and operates the same, said cutter 26 having a squared opening engaging with said spindle 24, the exterior walls of which are cone-shaped and provided with the cutter edges 27, said movable cutter 26 projecting upwardly or into the stationary cutter. The upper end of the spindle 24 is threaded, as at 28, and is adapted to be engaged by a set-screw 29 or other suitable device for locking the parts in position, it being seen that the spindle, the handle, and the rotary cutter are held in place by said set-screw and that by loosening or tightening the same the rotary cutter 26 can be adjusted with respect to the stationary cutter—that is, can be brought closer within or removed away from said stationary cutter 9, as desired.

30 designates a receiving-cup which is provided with the two lugs 31, spaced apart, and between which is adapted to be seated the rib 13 when the said cup is in position, said lug 31 extending slightly above the rim of the cup 30, forming the shoulders 32, while beneath the said lugs the said cup is slightly flattened, as at 33, thereby forming shoulders 34, it being seen that the said lugs 31 are adapted to pass between the said lugs 20 and 21 and when in proper position the shoulders 32 abutting against the lugs 20, while the shoulders 34 rest upon the lugs 21, so that the cup 30 is maintained in position.

Pivoted to the lug 6 is the cover-plate 35, which is provided with a finger-piece 36 for ease of operating the same.

The operation of the device will be readily seen. The cover-plate 35 is moved aside or turned on its pivot, next the coffee or other article to be ground is placed in the hopper, and by turning the handle 22 the spindle 24 is rotated, and with it the rotary cutter 26, so that the coffee passes down between the movable and the stationary cutter and is properly ground. It will be evident that the cutters can be quickly and easily adjusted so that the degree to which the coffee is ground can be varied as desired, since the movable cutter is mounted directly on the rotating spindle and as is also the adjusting means, so that by raising or lowering the spindle 24 the distance, as before stated, between the cutters is adjusted for evident purposes.

The stationary cutter may be independently adjusted by means of the set-screw 12, it being evident that so long as the lugs 8 have engagement with the recesses 7 the stationary cutter will be prevented from rotating and that by lengthening the slots or recesses 7 the amount of vertical adjustment of said cutter may be increased or varied as desired.

The receiving-cup can be easily and quickly placed in position, as described.

It will be evident that various changes may be made by those skilled in the art which may come within the scope of my invention, and I do not, therefore, desire to be limited in every instance to the exact construction herein shown and described.

Having thus described my invention, what I claim as new, and desire to secure by Letters Patent, is—

1. In a grinding-mill, a hopper, a sleeve depending therefrom, recesses in said sleeve, a stationary grinder mounted within said sleeve and closely engaged by the wall thereof, lugs on the lower portion of said grinder seated in said recesses, a flaring mouth for the said stationary cutter, a conical rotary grinder, a spindle carrying said rotary grinder, means for operating said spindle and a set-screw engaging with said spindle whereby the rotary grinder can be adjusted with respect to said stationary grinder.

2. In a grinding-mill, a hopper, a sleeve, depending therefrom, a stationary grinder adjustably mounted within said sleeve, a plate extending over said hopper and integral therewith, a bearing on said plate, a handle having a boss seated in said bearing, a spindle engaged by said handle, a rotary grinder carried by said spindle and a set-screw adapted to hold the parts in suitable relation and permitting adjustment of the rotary grinder with respect to said stationary grinder.

3. In a grinding-mill, a hopper, grinders suitably supported with respect to said hopper, each of said grinders being independently adjustable, a rib extending therefrom, movable means carried by said rib for engagement with a suitable support, lugs on said rib and a receiving-cup having lugs spaced apart between which said rib is adapted to pass, an upper and lower shoulder on said cup, lugs adapted to engage respectively with the lugs on said arm whereby the receiving-cup is held in position.

4. In a grinding-mill, a hopper having walls curved inwardly, a sleeve integral with and depending vertically from the hopper, a stationary cutter adjustably mounted in said sleeve, the inner walls of the stationary cutter forming a uniform reverse curve with the inner walls of the hopper, a rotary cutter, a spindle supporting the same and means for rotating said spindle.

5. In a grinding-mill, a hopper, grinders suitably supported with respect to said hopper, each of said grinders being independently adjustable, a plate extending over substantially one-half of the hopper and integral therewith, a bearing integral with said plate and a spindle carried by said bearing and carrying the rotary cutter.

6. In a grinding-mill, the combination of a hopper having a lug integral therewith and extending beyond the walls of the hopper, a plate extending over substantially one-half of the hopper and integral therewith, a bearing integral with said plate, a cover-plate pivoted on said lug, a handle provided with a boss adapted to be seated and to rotate in said bearing, a spindle engaged by said handle, a rotary cutter carried by said spindle, means for adjusting the spindle, and with it the rotary cutter, a sleeve depending from the hopper and integral therewith, a stationary cutter adjustably mounted in said sleeve, the inner walls of which form a uniform reverse curve with the inner walls of the hopper.

WILLIAM J. BUSSINGER.

Witnesses:
 JOHN A. WIEDERSHEIM,
 WM. CANER WIEDERSEIM.